(12) United States Patent  
Cooper

(10) Patent No.: US 7,054,720 B2  
(45) Date of Patent: *May 30, 2006

(54) OPERATING SYSTEM COORDINATED THERMAL MANAGEMENT

(75) Inventor: Barnes Cooper, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/900,917

(22) Filed: Jul. 28, 2004

(65) Prior Publication Data

US 2004/0268174 A1 Dec. 30, 2004

Related U.S. Application Data

(63) Continuation of application No. 10/020,848, filed on Dec. 12, 2001, now Pat. No. 6,823,240.

(51) Int. Cl.
*G05D 23/00* (2006.01)

(52) U.S. Cl. ...................... 700/299; 713/300

(58) Field of Classification Search ........ 700/299–300; 713/300, 322, 323–324, 501; 702/132

See application file for complete search history.

(56) References Cited

U.S. PATENT DOCUMENTS

| 5,723,998 A | 3/1998 | Saito et al. |
| 5,760,636 A * | 6/1998 | Noble et al. ................. 327/513 |
| 6,510,400 B1 * | 1/2003 | Moriyama .................. 702/132 |
| 6,636,910 B1 * | 10/2003 | Kung et al. .................... 710/60 |
| 2003/0110423 A1 * | 6/2003 | Helms et al. ................ 714/100 |

FOREIGN PATENT DOCUMENTS

| GB | 2 383 873 | 7/2003 |
| KR | 2001-18576 | 3/2001 |

* cited by examiner

*Primary Examiner*—Zoila Cabrera
(74) *Attorney, Agent, or Firm*—Trop, Pruner & Hu, P.C.

(57) ABSTRACT

A processor's performance state may be adjusted based on processor temperature. On transitions to a lower performance state due to the processor getting hotter, the processor's frequency is reduced prior to reducing the processor voltage. Thus, the processor's performance, as seen by the operating system, is reduced immediately. Conversely, on transitions to a higher performance state, due to the processor cooling down, the processor's frequency is not increased until the voltage is changed to a higher level. An interrupt event may be generated anytime the processor's phase locked loop relocks at a new frequency level. Thus, when the interrupt fires, the operating system can read the processor's performance state. As a result, interrupts are not generated that would cause processor performance to lag the interrupt event.

62 Claims, 3 Drawing Sheets

OPERATING SYSTEM COORDINATED THERMAL MANAGEMENT

This is a continuation of prior application Ser. No. 10/020,848, filed Dec. 12, 2001 now U.S. Pat. No. 6,823,240.

BACKGROUND

The invention relates to thermal management of processor-based systems.

Both hardware and software-controlled techniques exist for power and thermal management of processor-based systems. Software-based solutions are primarily utilized in connection with mobile platforms.

The software-controlled techniques involve an interrupt generated when a processor temperature setting is exceeded. The processor may be throttled after detecting an over temperature condition by polling processor temperature. Generally, the software-controlled solutions have a slower response time than the hardware-controlled solutions. In addition, there tends to be overshoot and undershoot problems with software-controlled solutions. The sensors utilized in software-controlled solutions are relatively slow and inaccurate. The on-die sensor (which is normally a diode) is not located on the hottest part of the processor die.

The hardware-controlled solution, used in systems other than mobile systems, involves a processor that automatically engages processor throttling, reducing the effective clock rate when a temperature condition is exceeded and disabling throttling when the processor is sufficiently cool. The hardware-controlled solution is based on an on-die binary sensor that indicates whether the processor is either hot or not hot. An interrupt capability may be available but is generally not utilized by the operating system due to the infrequency of throttling in desktop systems which are the primary applications for hardware-controlled solutions. As a result, operating systems may be unaware of hardware-controlled throttling.

The software-controlled solution is based on the premise that the platform exposes a variety of trip points to the operating system. A trip point is a temperature for a particular thermal region when some action should be taken. As the temperature goes above or below any trip point, the platform is responsible for notifying the operating system of this event and the operating system then takes an appropriate action.

When a temperature crosses a passive trip point, the operating system is responsible for implementing an algorithm to reduce the processor's temperature. It may do so by generating a periodic event at a variable frequency. The operating system then monitors the current temperature as well as the last temperature and applies an algorithm to make performance changes in order to keep the processor at the target temperature.

While current versions of hardware-controlled throttling reduce the frequency of the processor by rapidly stopping and starting the processor, future versions of hardware-controlled throttling may reduce the performance state of the processor by reducing both frequency and voltage. Because the hardware-controlled throttling is directly activated and has an extremely fast response time, the trip point for triggering the passive thermal management can be set near the high temperature specification of the processor (known as the junction temperature), thereby delivering high performance for most system designs.

Software-controlled throttling is exposed to the operating system, allowing the operating system to know the processor performance at all times. This becomes especially important with future operating systems that guarantee some quality of service based upon the processor performance to the executing applications. This concept is known as guaranteed bandwidth allocation and is based on the processor's current performance level.

Hardware-controlled throttling is advantageous in that it delivers the best possible performance in any given thermal solution, has extremely fast response time and does not throttle prematurely. A disadvantage to hardware-controlled throttling is that the operating system is completely unaware that the processor performance has been altered. Because of this, it may be expected that hardware-controlled throttling may cause issues with future operating systems that implement a guaranteed bandwidth scheduling.

Thus, there is a need for thermal management solutions that achieve advantages of both hardware and software-controlled techniques.

DETAILED DESCRIPTION

Figure 1:
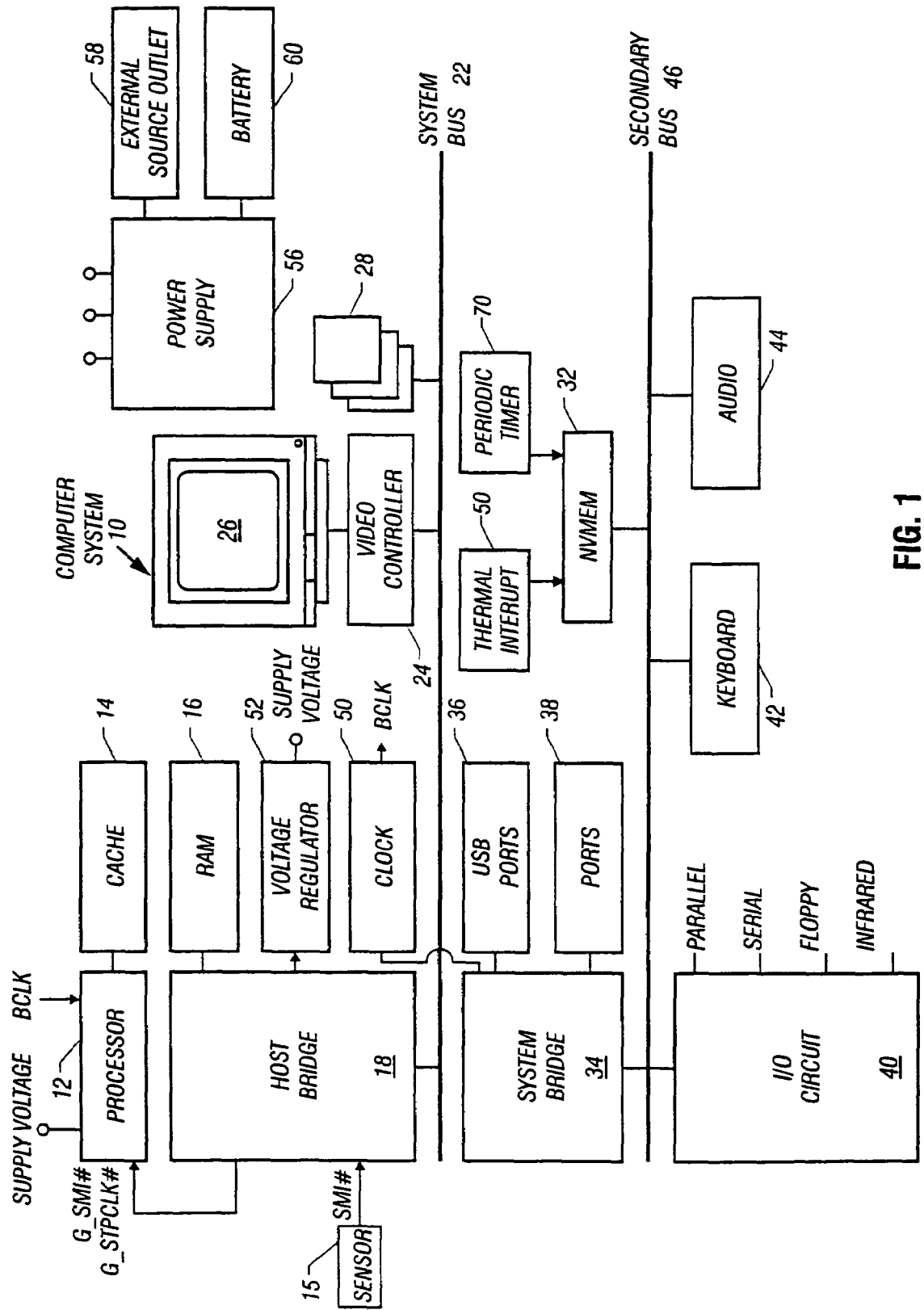
FIG. 1 is a block diagram of a system according to an embodiment of the invention.

Referring to FIG. 1, a processor-based system 10 according to an embodiment of the invention includes one or more processors 12. The system 10 may include a general- or special-purpose computer, a microprocessor- or microcontroller-based system, a hand-held computing device, a set-top box, an appliance, a game system, or any controller-based device in which the controller may be programmable.

One or more temperature sensor units 15 monitor system temperature in one or more corresponding thermal zones, each capable of issuing an interrupt, e.g., a system management interrupt (SMI), a system controller interrupt (SCI), or some other notification when a sensed temperature rises above a preset target temperature $T_t$ or falls below the target temperature $T_t$.

In one embodiment, when the monitored temperature is above $T_t$, a thermal engage SMI is generated. On the other hand, when the monitored temperature is below $T_t$, a thermal disengage SMI is generated. While the monitored temperature remains above or below $T_t$, the thermal engage or disengage SMI may be generated at periodic intervals to allow software or firmware to manage the performance level of the processor.

In alternative embodiments, other components (e.g., bridge controller chips, peripheral controllers) in the system may be transitioned between or among the different performance states as well as throttled for system thermal management. In addition, thermal management in the system 10 may be performed independently for multiple thermal zones.

In FIG. 1, the interrupt event generated by the temperature sensor unit 15 may be routed directly to the processor 12 or to a host bridge 18 coupled between the processor 12 and a system bus 22, which may in one embodiment be a Peripheral Component Interconnect (PCI) bus, as defined in the PCI Local Bus Specification, Production Version, Revision 2.1, published on Jun. 1, 1995. Alternatively, the interrupt event may be stored as a memory or I/O-mapped register bit that is polled by a software or firmware module.

To perform throttling, a clock control input (such as the stop clock input illustrated as G_STPCLK# in FIG. 1 to an 80×86 or Pentium® family processor from Intel Corporation) is activated and deactivated according to a preset duty cycle. The signal G_STPCLK# is generated by thermal management control logic and routed to the STPCLK# input pin of processors made by Intel for example. The STPCLK# internally gates clocks to the core of these processors. Activation of the clock control input (by driving G_STPCLK# low, for example) causes the processor 12 to enter a significantly reduced power mode in which an internal clock of the processor is stopped and most functions are disabled. Throttling is thus accomplished by activating the clock control input a certain percentage of the time to disable processor activity while allowing processor activity the rest of the time.

Other components of the system 10 include a clock generator 50 that generates a host clock BCLK to the processor 12 and a voltage regulator 52 that regulates the supply voltage of the processor 12. In one embodiment, the clock generator 50, processor 12, and voltage regulator 52 are controllable to transition the system 10 between or among different performance states.

A cache memory 14 is coupled to the processor 14 and system memory 16 is controlled by a memory controller in the host bridge 18. The system bus 22 may be coupled to other components, including a video controller 24 coupled to a display 26 and peripheral devices coupled through slots 28. A secondary or expansion bus 46 is coupled by a system bridge 34 to the system bus 22. The system bridge 34 may include interface circuits to different ports, including a universal serial bus (USB) port 36 (as described in the Universal Serial Bus Specification, Revision 1.0, published in January 1996) and mass storage ports 38 that may be coupled to mass storage devices such as a hard disk drive, compact disc (CD) or digital video disc (DVD) drives, and the like.

Other components coupled to the secondary bus 46 may include an input/output (I/O) circuit 40 connectable to a parallel port, serial port, floppy drive, and infrared port. A non-volatile memory 32 for storing Basic Input/Output System (BIOS) routines may be located on the bus 46, as may a keyboard device 42 and an audio control device 44. The main power supply voltages in the system 10 are provided by a power supply circuit 56 that is coupled to a battery 60 and an external power source outlet 58. References to specific components in the system 10 are for illustrative purposes—it is to be understood that other embodiments of the system 10 are possible.

Various software or firmware layers (formed of modules or routines, for example), including applications, operating system modules, device drivers, BIOS modules, and interrupt handlers, may be stored in one or more storage media in the system. The storage media includes the hard disk drive, CD or DVD drive, floppy drive, non-volatile memory, and system memory. The modules, routines, or other layers stored in the storage media contain instructions that when executed causes the system 10 to perform programmed acts.

The software or firmware layers, such as the thermal interrupt software 50 and the periodic timer software 70, can be loaded into the system 10 in one of many different ways. For example, code segments stored on floppy disks, CD or DVD media, the hard disk, or transported through a network interface card, modem, or other interface mechanism may be loaded into the system 10 and executed as corresponding software or firmware layers. In the loading or transport process, data signals that are embodied as carrier waves (transmitted over telephone lines, network lines, wireless links, cables, and the like) may communicate the code segments to the system 10.

Thermal interrupt software 50 initially determines whether a frequency change, high temperature or a low temperature interrupt has been received as indicated in diamond 52. High temperature and low temperature interrupts are conventional software-controlled interrupts. The frequency change interrupt is hardware-controlled but differs from conventional hardware-controlled interrupts in that the operating system is notified at an appropriate time, for example to enable guaranteed bandwidth allocation.

In some systems, rather than simply throttle the processor, the performance state of the processor 12 may be directly controlled. The performance state involves both the frequency and the voltage. In such case, throttling may directly reduce or increase the performance state as the processor 12 goes above or below the on-die sensor 15 trip point.

On transitions to a lower performance state (due to the processor getting hotter), the processor's frequency is reduced prior to reducing the processor voltage. The processor's performance, as seen by the operating system, will be reduced immediately. That is, the performance reduces as soon as the frequency is reduced.

On transitions to a higher performance state (due to the processor cooling down), the processor's frequency is not increased until the voltage is changed to a higher level. This voltage change is dependent on many factors. In general, it takes some amount of time to create the voltage change. As a result, the performance change would lag the interrupt event if the interrupt event were generated upon the voltage change.

Instead, the interrupt event may be generated any time the processor's phase locked loop (PLL) relocks at a new frequency level. Thus, when the interrupt fires, the operating system can read the processor's performance state, determine the new performance level of the processor, reschedule guaranteed bandwidth allocations as required and then resume normal operations.

Figure 2:
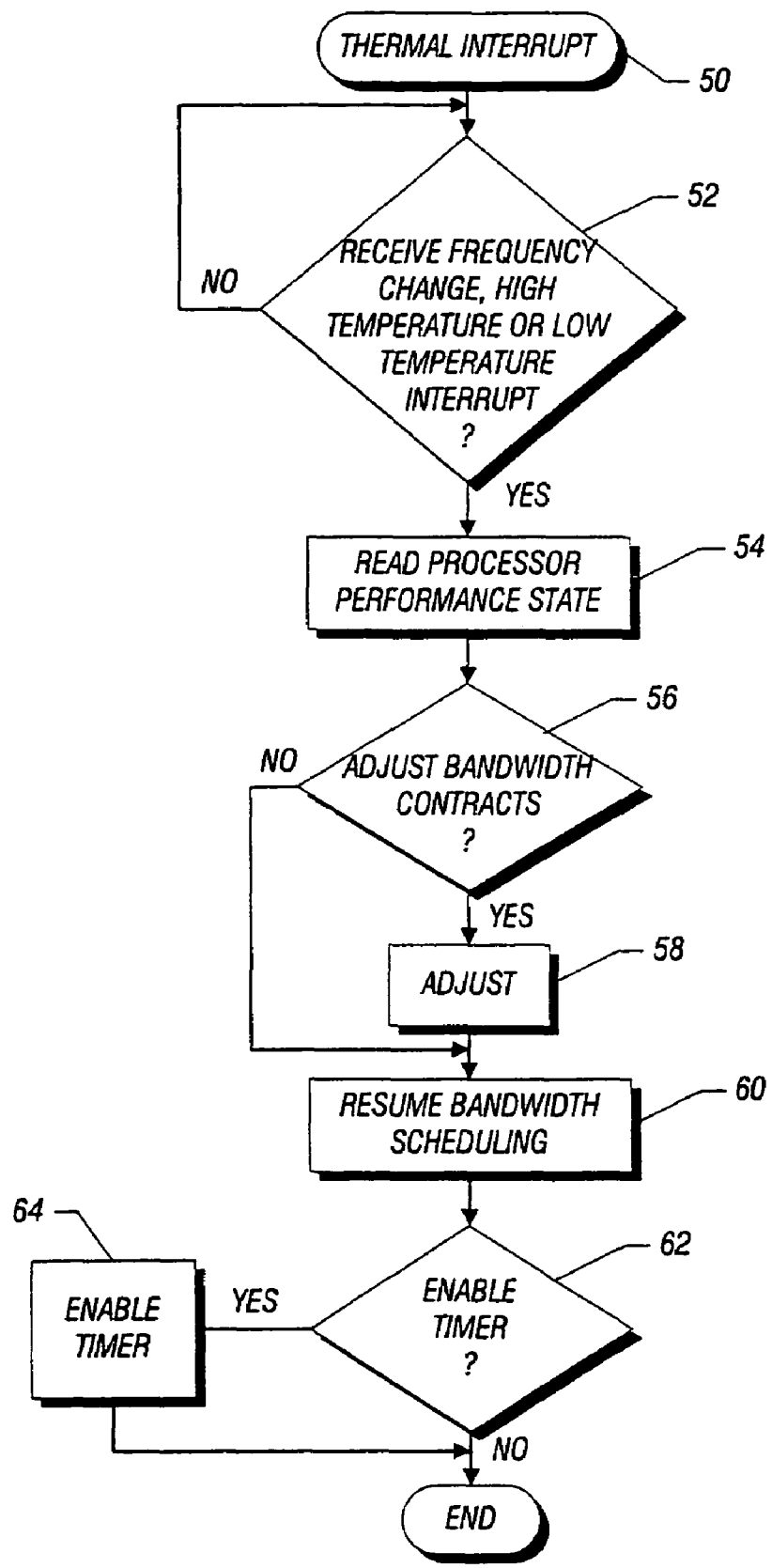
FIG. 2 is a flow diagram of a power management module in the system of FIG. 1.

Referring to FIG. 2, if an event is detected in diamond 52, the processor performance state is read. This may be done by accessing processor registers to determine the cause of the event as well as to take further action. The amount of code is small, bounded and can be page locked in physical memory in some embodiments.

When the operating system receives any of the three sources of thermal management interrupt vectors, as determined in diamond 52, the processor can check whether the processor is hot or cold and look up the current performance state, as indicated in block 54, based upon registers defined already and take appropriate action. Typical registers may include on-die throttling control and the performance state status register.

In accordance with one embodiment of the present invention, the new interrupt may be added to existing interrupt models for hot and cold interrupt generation. The frequency change interrupt may have an enable bit to allow the operating system to enable or disable the event, but no status register may be needed in some embodiments.

Next, a check at diamond 56 determines whether the bandwidth contracts need to be adjusted in view of the current processor performance state. If so, the contracts are adjusted as indicated in block 58. Thereafter, the bandwidth scheduling may be resumed as indicated in block 60. A check at diamond 62 determines whether a periodic timer should be implemented. The operating system may enable a periodic timer event to begin monitoring the processor temperature if the interrupt is indicative of a processor thermal event, as indicated block 64.

Figure 3:
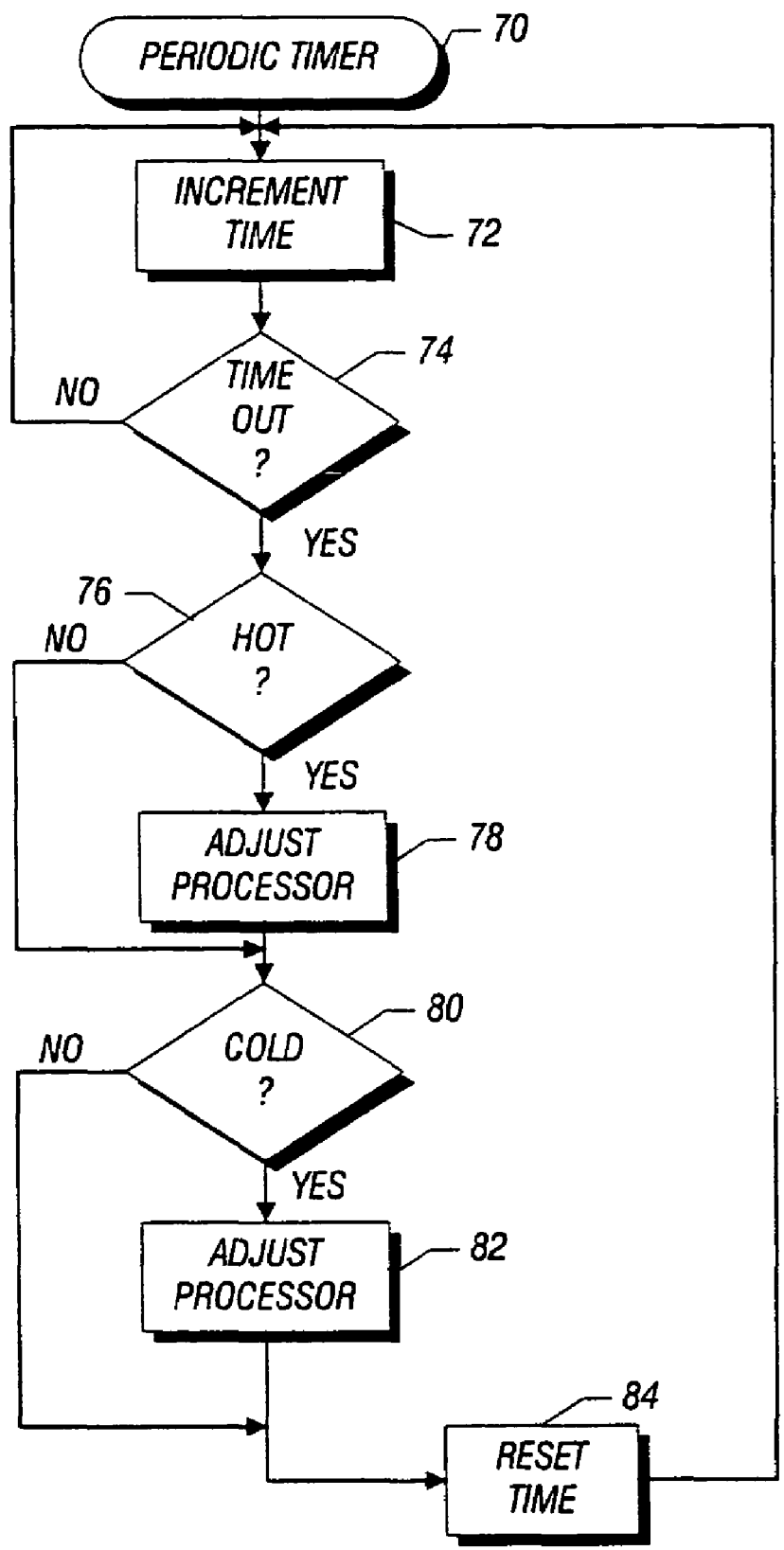
FIG. 3 is a flow diagram for another module in the system of FIG. 1.

The periodic timer software 70, shown in FIG. 3, begins by incrementing the time as indicated in block 72. A check at diamond 74 determines whether a time out has occurred. If so, a check at diamond 76 determines whether the processor is still hot. If so, the operating system may decide to reduce the processor performance state and/or enable on-die throttling and/or increase the internal effective frequency of on-die throttling as indicated in block 78.

A check at diamond 80 determines whether the processor has now cooled off. If so, the operating system may decide to increase the processor performance state and/or disable on-die throttling and/or increase the internal effective frequency of on-die throttling as indicated in block 82. Thereafter, the time is reset as indicated in block 84 and the flow may recycle.

Particularly with mobile platforms, increased performance may be realized by utilizing the software and hardware-controlled solutions described above. By allowing hardware-controlled throttling to coexist with operating system dispatch algorithms, fast, efficient thermal management may be achieved in some embodiments while still enabling guaranteed bandwidth allocation schemes.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting that a processor's frequency has changed;
   generating an interrupt in response to the detection of the frequency change;
   determining whether the performance state of the processor is going to be a lower performance state; and
   changing the processor's frequency and then the processor's voltage if the performance state of the processor is going to be the lower performance state.

2. The method of claim 1 including providing an interrupt to an operating system.

3. The method of claim 2 including setting up a periodic timer.

4. The method of claim 3 including monitoring the processor temperature at periodic intervals.

5. The method of claim 1 including reading the performance state of the processor in response to the interrupt.

6. The method of claim 5 including determining a new performance state.

7. The method of claim 6 including scheduling a bandwidth allocation.

8. The method of claim 1 including detecting a high temperature or a low temperature interrupt and reading the processor performance state in response to the detection of a high temperature or a low temperature interrupt.

9. The method of claim 1 wherein detecting a frequency change includes detecting a processor phase locked loop event.

10. The method of claim 1 including using hardware controlled throttling.

11. The method of claim 1 including determining whether the performance state of the processor is going to be a higher performance state; and
   changing the processor's voltage and then the processor's frequency if the performance state of the processor is going to be the higher performance state.

12. An article comprising a medium storing instructions that, if executed, enable a processor-based system to:
   detect that a processor's frequency has changed:
   generate an interrupt in response to the detection of the frequency change;
   determine whether the performance state of the processor is going to be a lower performance state; and
   change the processor's frequency and then the processor's voltage if the performance state of the processor is going to be the lower performance state.

13. The article of claim 12 further storing instructions that, if executed, enable a processor-based system to provide an interrupt to an operating system.

14. The article of claim 13 further storing instructions that, if executed, enable a processor-based system to set up a periodic timer.

15. The article of claim 14 further storing instructions that, if executed, enable a processor-based system to monitor the processor temperature at periodic intervals.

16. The article of claim 12 further storing instructions that, if executed, enable a processor-based system to read the performance state of the processor in response to the interrupt.

17. The article of claim 16 further storing instructions that, if executed, enable a processor-based system to determine a new performance state.

18. The article of claim 17 further storing instructions that, if executed, enable a processor-based system to schedule a bandwidth allocation.

19. The article of claim 12 further storing instructions that, if executed, enable a processor-based system to detect a high temperature or a low temperature interrupt and read the processor performance state in response to the detection of a high temperature or a low temperature interrupt.

20. The article of claim 12 further storing instructions that, if executed, enable a processor-based system to detect a processor phase locked loop event.

21. The article of claim 12 further storing instructions that, if executed, enable a processor-based system to use hardware controlled throttling.

22. The article of claim 12 further storing instructions that, if executed, enable a processor-based system to determine whether the performance state of the processor is going to be a higher performance state; and
   change the processor's voltage and then the processor's frequency if the performance state of the processor is going to be the higher performance state.

23. A system comprising:
   a processor;
   a temperature sensor coupled to said processor; and
   a storage storing instructions that enable the processor to detect that the processor's frequency has changed and generate an interrupt in response to detection of the frequency change, determine whether the performance state of the processor is going to be a lower performance state, and change the processor's frequency and then the processor's voltage if the performance state of the processor is going to be the lower performance state.

24. The system of claim 23 including a storage storing an operating system, said interrupt being provided to the operating system.

25. The system of claim 24 wherein said storage stores instructions that enable the processor to set up a periodic timer.

26. The system of claim 25 wherein said storage stores instructions that enable the processor to monitor the processor temperature at periodic intervals.

27. The system of claim 23 wherein said storage stores instructions that enable the processor to read the performance state of the processor in response to an interrupt.

28. The system of claim 23 wherein said processor determines a new performance state.

29. The system of claim 28 wherein said storage stores instructions that enable the processor to schedule a bandwidth allocation.

30. The system of claim 23 wherein said storage stores instructions that enable the processor to detect a high temperature or a low temperature interrupt and read the processor performance state in response to the detection of a high temperature or a low temperature interrupt.

31. The system of claim 23 wherein said storage stores instructions that enable the processor to detect a processor phase locked loop event.

32. The system of claim 23 including hardware controlled throttling.

33. A method comprising:
  detecting that a processor's frequency has changed;
  generating an interrupt in response to the detection of the frequency change;
  determining whether the performance state of the processor is going to be a higher performance state; and
  changing the processor's voltage and then the processor's frequency if the performance state of the processor is going to be the higher performance state.

34. The method of claim 33 including providing an interrupt to an operating system.

35. The method of claim 34 including setting up a periodic timer.

36. The method of claim 34 including monitoring the processor temperature at periodic intervals.

37. The method of claim 33 including reading the performance state of the processor in response to the interrupt.

38. The method of claim 37 including determining a new performance state.

39. The method of claim 38 including scheduling a bandwidth allocation.

40. The method of claim 33 including detecting a high temperature or a low temperature interrupt and reading the processor performance state in response to the detection of a high temperature or a low temperature interrupt.

41. The method of claim 33 wherein detecting a frequency change includes detecting a processor phase locked loop event.

42. The method of claim 33 including using hardware controlled throttling.

43. An article comprising a medium storing instructions that, if executed, enable a processor-based system to:
  detect that a processor's frequency has changed;
  generate an interrupt in response to the detection of the frequency change;
  determine whether the performance state of the processor is going to be a higher performance state; and
  change the processor's voltage and then the processor's frequency if the performance state of the processor is going to be the higher performance state.

44. The article of claim 43 further storing instructions that, if executed, enable a processor-based system to provide an interrupt to an operating system.

45. The article of claim 44 further storing instructions that, if executed, enable a processor-based system to set up a periodic timer.

46. The article of claim 45 further storing instructions that, if executed, enable a processor-based system to monitor the processor temperature at periodic intervals.

47. The article of claim 43 further storing instructions that, if executed, enable a processor-based system to read the performance state of the processor in response to the interrupt.

48. The article of claim 47 further storing instructions that, if executed, enable a processor-based system to determine a new performance state.

49. The article of claim 48 further storing instructions that, if executed, enable a processor-based system to schedule a bandwidth allocation.

50. The article of claim 43 further storing instructions that, if executed, enable a processor-based system to detect a high temperature or a low temperature interrupt and read the processor performance state in response to the detection of a high temperature or a low temperature interrupt.

51. The article of claim 43 further storing instructions that, if executed, enable a processor-based system to detect a processor phase locked loop event.

52. The article of claim 43 further storing instructions that, if executed, enable a processor-based system to use hardware controlled throttling.

53. A system comprising:
  a processor;
  a temperature sensor coupled to said processor; and
  a storage storing instructions that enable the processor to detect that the processor's frequency has changed and generate an interrupt in response to detection of the frequency change, determine whether the performance state of the processor is going to be a higher performance state, and change the processor's voltage and then the processor's frequency if the performance state of the processor is going to be the higher performance state.

54. The system of claim 53 including a storage storing an operating system, said interrupt being provided to the operating system.

55. The system of claim 54 wherein said storage stores instructions that enable the processor to set up a periodic timer.

56. The system of claim 55 wherein said storage stores instructions that enable the processor to monitor the processor temperature at periodic intervals.

57. The system of claim 53 wherein said storage stores instructions that enable the processor to read the performance state of the processor in response to an interrupt.

58. The system of claim 53 wherein said processor determines a new performance state.

59. The system of claim 58 wherein said storage stores instructions that enable the processor to schedule a bandwidth allocation.

60. The system of claim 53 wherein said storage stores instructions that enable the processor to detect a high temperature or a low temperature interrupt and read the processor performance state in response to the detection of a high temperature or a low temperature interrupt.

61. The system of claim 53 wherein said storage stores instructions that enable the processor to detect a processor phase locked loop event.

62. The system of claim 53 including hardware controlled throttling.

* * * * *